US011654803B2

(12) United States Patent
Kikuchi et al.

(10) Patent No.: US 11,654,803 B2
(45) Date of Patent: May 23, 2023

(54) CONVEYANCE SEAT

(71) Applicant: TS TECH CO., LTD., Saitama (JP)

(72) Inventors: Kenta Kikuchi, Tochigi (JP); Yohei Urabe, Tochigi (JP)

(73) Assignee: TS TECH CO., LTD., Saitama (JP)

(*) Notice: Subject to any disclaimer, the term of this patent is extended or adjusted under 35 U.S.C. 154(b) by 0 days.

(21) Appl. No.: 17/515,654

(22) Filed: Nov. 1, 2021

(65) Prior Publication Data

US 2022/0048418 A1  Feb. 17, 2022

Related U.S. Application Data

(63) Continuation of application No. 16/615,622, filed as application No. PCT/JP2018/019279 on May 18, 2018, now abandoned.

(30) Foreign Application Priority Data

May 23, 2017  (JP) .............................. JP2017-101871

(51) Int. Cl.
*A47C 7/72* (2006.01)
*B60N 2/56* (2006.01)
*A47C 7/74* (2006.01)
*B60H 1/00* (2006.01)
*B60N 2/68* (2006.01)

(52) U.S. Cl.
CPC ............ *B60N 2/5657* (2013.01); *A47C 7/744* (2013.01); *B60H 1/00521* (2013.01); *B60N 2/5642* (2013.01); *B60N 2/68* (2013.01)

(58) Field of Classification Search
CPC .. B60N 2/5657; B60N 2/5642; B60N 2/5621; B60N 2/5635; B60N 2/56; B60N 2/68
See application file for complete search history.

(56) References Cited

U.S. PATENT DOCUMENTS

| | | | |
|---|---|---|---|
| 5,102,189 A * | 4/1992 | Saito ................... | B60N 2/5635 422/123 |
| 6,439,666 B1 | 8/2002 | Kimura et al. | |
| 6,736,452 B2 * | 5/2004 | Aoki ................... | B60N 2/5657 297/180.13 |

(Continued)

FOREIGN PATENT DOCUMENTS

| | | | |
|---|---|---|---|
| JP | 2001-145537 A | 5/2001 | |
| JP | 2006-102329 A | 4/2006 | |

(Continued)

OTHER PUBLICATIONS

International Search Report dated Jul. 10, 2018 for the corresponding International application No. PCT/JP2018/019279, with English translation.

*Primary Examiner* — Shin H Kim

(74) *Attorney, Agent, or Firm* — Michael Best & Friedrich LLP

(57) ABSTRACT

Provided is a conveyance seat in which a duct connected to a fan can be compactly disposed, and the fan is provided in a pan-frame-type seat cushion. The vehicle seat includes a seat cushion (S2) and a blower (48) provided in the seat cushion (S2). The seat cushion (S2) is provided with a plate-shaped pan frame (42). The blower (48) is provided below the pan frame (42), a duct (49) is connected to the blower (48), and an opening (42*a*) through which the duct (49) extends is formed in the pan frame (42).

8 Claims, 13 Drawing Sheets

(56) References Cited

U.S. PATENT DOCUMENTS

| | | | |
|---|---|---|---|
| 6,929,322 B2* | 8/2005 | Aoki | B60H 1/00285 |
| | | | 297/180.13 |
| 6,976,734 B2* | 12/2005 | Stoewe | B60N 2/5635 |
| | | | 297/180.13 |
| 7,261,372 B2 | 8/2007 | Aoki | |
| 7,963,595 B2 | 6/2011 | Ito et al. | |
| 8,167,368 B2* | 5/2012 | Eckel | B60N 2/565 |
| | | | 297/180.13 |
| 8,641,086 B2 | 2/2014 | Hashido et al. | |
| 8,662,579 B2 | 3/2014 | Yoshizawa et al. | |
| 8,752,892 B2* | 6/2014 | Sahashi | B60N 2/5635 |
| | | | 297/180.13 |
| 8,757,726 B2 | 6/2014 | Oota | |
| 9,121,414 B2 | 9/2015 | Lofy et al. | |
| 10,123,628 B2* | 11/2018 | Ishii | F04D 29/281 |
| 10,160,356 B2 | 12/2018 | Lofy et al. | |
| 10,240,607 B2* | 3/2019 | Wheeler | H02K 1/182 |
| 10,293,720 B2* | 5/2019 | Okimura | B60N 2/56 |
| 10,433,647 B2 | 10/2019 | Jibiki et al. | |
| 10,603,976 B2* | 3/2020 | Androulakis | B60N 2/5685 |
| 10,856,664 B2* | 12/2020 | Bhatia | A47C 7/746 |
| 10,981,476 B2 | 4/2021 | Kim et al. | |
| 2003/0102699 A1* | 6/2003 | Aoki | B60H 1/00285 |
| | | | 297/180.13 |
| 2005/0173950 A1 | 8/2005 | Bajic et al. | |
| 2006/0138812 A1 | 6/2006 | Aoki | |
| 2007/0262621 A1 | 11/2007 | Dong et al. | |
| 2009/0033130 A1 | 2/2009 | Marquette et al. | |
| 2009/0079236 A1 | 3/2009 | Itou et al. | |
| 2009/0295200 A1 | 12/2009 | Ito et al. | |
| 2011/0109128 A1 | 5/2011 | Axakov et al. | |
| 2011/0226461 A1* | 9/2011 | Fujii | B60N 2/5635 |
| | | | 165/47 |
| 2012/0261974 A1 | 10/2012 | Yoshizawa | |
| 2012/0267937 A1 | 10/2012 | Sahashi | |
| 2013/0020841 A1 | 1/2013 | Oota | |
| 2013/0137354 A1* | 5/2013 | Tsuzaki | B60N 2/5657 |
| | | | 454/75 |
| 2015/0210193 A1* | 7/2015 | Kurosawa | B60N 2/5671 |
| | | | 297/180.13 |
| 2015/0274046 A1* | 10/2015 | Wang | B60N 2/80 |
| | | | 297/180.13 |
| 2015/0329027 A1* | 11/2015 | Axakov | B60N 2/5621 |
| | | | 297/180.13 |
| 2017/0028886 A1* | 2/2017 | Zhang | B60N 2/5657 |
| 2017/0036575 A1 | 2/2017 | Kobayashi et al. | |
| 2017/0248146 A1* | 8/2017 | Wheeler | B60N 2/5642 |
| 2017/0320416 A1 | 11/2017 | Yu et al. | |
| 2017/0361742 A1* | 12/2017 | Craig | B60N 2/5657 |
| 2018/0020838 A1* | 1/2018 | Ishii | B60N 2/5692 |
| | | | 297/180.13 |
| 2018/0070731 A1 | 3/2018 | Jibiki et al. | |
| 2018/0111526 A1 | 4/2018 | Okimura et al. | |
| 2018/0147962 A1* | 5/2018 | Longatte | B60N 2/5621 |
| 2018/0272908 A1 | 9/2018 | Onuma et al. | |
| 2019/0143859 A1 | 5/2019 | Sakoda et al. | |
| 2019/0176663 A1 | 6/2019 | Hoshi et al. | |
| 2019/0241102 A1 | 8/2019 | Okimura et al. | |
| 2020/0361350 A1 | 11/2020 | Hoshi et al. | |

FOREIGN PATENT DOCUMENTS

| | | |
|---|---|---|
| JP | 2013-177027 A | 9/2013 |
| WO | 2015/156218 A1 | 10/2015 |
| WO | 2017/002764 A1 | 1/2017 |

* cited by examiner

CONVEYANCE SEAT

CROSS-REFERENCE TO RELATED APPLICATIONS

This application is a continuation of U.S. patent Ser. No. 16/615,622, filed on Nov. 21, 2019, which, in turn, is a National Stage Entry of PCT Application No. PCT/JP2018/019279, filed on May 18, 2018. Further, this application claims priority from Japanese Patent Application No. 2017-101871, filed on May 23, 2017, the entire contents of which are hereby incorporated by reference into this application.

TECHNICAL FIELD

The present invention relates to a conveyance seat, and particularly to a conveyance seat including a blower.

BACKGROUND ART

Some seat cushions of conveyance seats including vehicle seats, etc. include a plate-shaped pan frame.

For example, Patent Literature 1 describes an invention relating to a pan frame provided in a seat cushion that constitutes a vehicle seat, characterized in that a bead is formed on the pan frame in order to increase strength.

CITATION LIST

Patent Literature

PATENT LITERATURE 1: JP 2001-145537 A

SUMMARY OF INVENTION

Technical Problem

In some vehicle seats for luxury vehicles, in order to provide comfort to a seat occupant, a fan such as a blower for sending air toward the seat occupant is provided in the interior thereof.

However, in the seat cushion provided with the pan frame described in Patent Literature 1, in order to blow air toward the seat occupant, it is necessary to dispose a fan on the pan frame. Therefore, in order to ensure the region for disposing the fan, it was necessary to increase the height of seat cushion.

In addition, when the fan is disposed on the side of the seat occupant with respect to the pan frame in this way, vibration accompanying the operation of the fan is easily transmitted to the seat occupant, and the vibration may provide discomfort to the seat occupant.

Furthermore, it takes time to attach a harness for supplying power to the fan to the seat cushion, resulting in a lot of time to attach the fan and the harness.

The present invention has been made in view of the above problems, and an object thereof is to provide a conveyance seat in which a duct connected to a fan can be compactly arranged, and a pan-frame-type seat cushion is provided with a fan.

Another object of the present invention is to prevent the vibration of the fan from being transmitted to a seat occupant.

Another object of the present invention is to easily fix a harness to a bracket.

Solution to Problem

According to a conveyance seat of the present invention, the above problem is solved by a conveyance seat including a seat cushion and a fan provided in the seat cushion, wherein the seat cushion is provided with a plate-shaped pan frame, the fan is provided below the pan frame, a duct is connected to the fan, and an opening through which the duct extends is formed in the pan frame.

In the above configuration, the opening through which the duct extends is formed in the pan frame provided in the conveyance seat. Therefore, it is possible to provide a conveyance seat in which the duct connected to the fan can be compactly arranged, and a pan-frame-type seat cushion is provided with the fan.

Preferably, the duct has a bellows shape including a recess and a protrusion that are formed continuously in one direction, and the recess of the bellows shape is arranged so as to overlap the opening of the pan frame in the one direction.

According to the above configuration, since the recess of the duct having a bellows shape is arranged so as to overlap the opening of the pan frame, it is possible to prevent the duct from coming off the pan frame.

Preferably, a bracket for disposing the fan in the seat cushion is further provided, the bracket includes a main body portion formed at a position separated from the pan frame with the bracket being attached to the pan frame, and attachment portions attached to the pan frame, and the fan is attached to the main body portion of the bracket.

According to the above configuration, since the fan is attached to the main body portion of the bracket and is attached to the pan frame via the bracket, it is possible to prevent the vibration of the fan from being transmitted to the seat occupant.

Preferably, an opening through which the duct extends is formed in the bracket.

According to the above configuration, since the opening through which the duct extends is formed in the bracket, it is possible to prevent the arrangement of the duct from being restricted by the bracket.

Preferably, a harness is connected to the fan, a clip is attached to the harness, and a fixing portion for fixing the clip is provided in the bracket.

According to the above configuration, since the fixing portion for fixing the clip of the harness is provided in the bracket, it is possible to easily and stably fix the harness to the bracket.

Advantageous Effects of Invention

According to this invention, it is possible to provide a conveyance seat in which the duct connected to the fan can be compactly arranged, and a pan-frame-type seat cushion is provided with a fan.

Furthermore, according to the present invention, it is possible to prevent the duct from coming off the pan frame.

Furthermore, according to the present invention, it is possible to prevent the vibration of the fan from being transmitted to the seat occupant.

Furthermore, according to the present invention, it is possible to prevent the arrangement of the duct from being restricted by the bracket.

Furthermore, according to the present invention, it is possible to easily and stably fix the harness to the bracket.

DESCRIPTION OF EMBODIMENTS

Hereinafter, a vehicle seat S according to an embodiment of the present invention (this embodiment) will be described with reference to the drawings. The embodiments described below are given for mere illustration to facilitate understanding of the present invention, and are not intended to limit the present invention. That is, it should be understood that the shapes, dimensions, arrangements, and others of the members described below can be changed and improved without departing from the spirit of the present invention, and equivalents thereof are included in the present invention.

Hereinafter, the vehicle seat S will be described as an example, but the vehicle seat S is mere illustration to facilitate understanding of the present invention, and is not intended to limit the present invention. That is, a seat provided with a blower 48 according to the present invention can be applied to a conveyance other than a vehicle, for example, a ship, an aircraft, a machine with a seat, or the like.

In the following description, a front to back direction, a right to left direction, and an up to down direction correspond to respective directions viewed from a seat occupant in the vehicle seat S.

<Overall Configuration>

Figure 1:
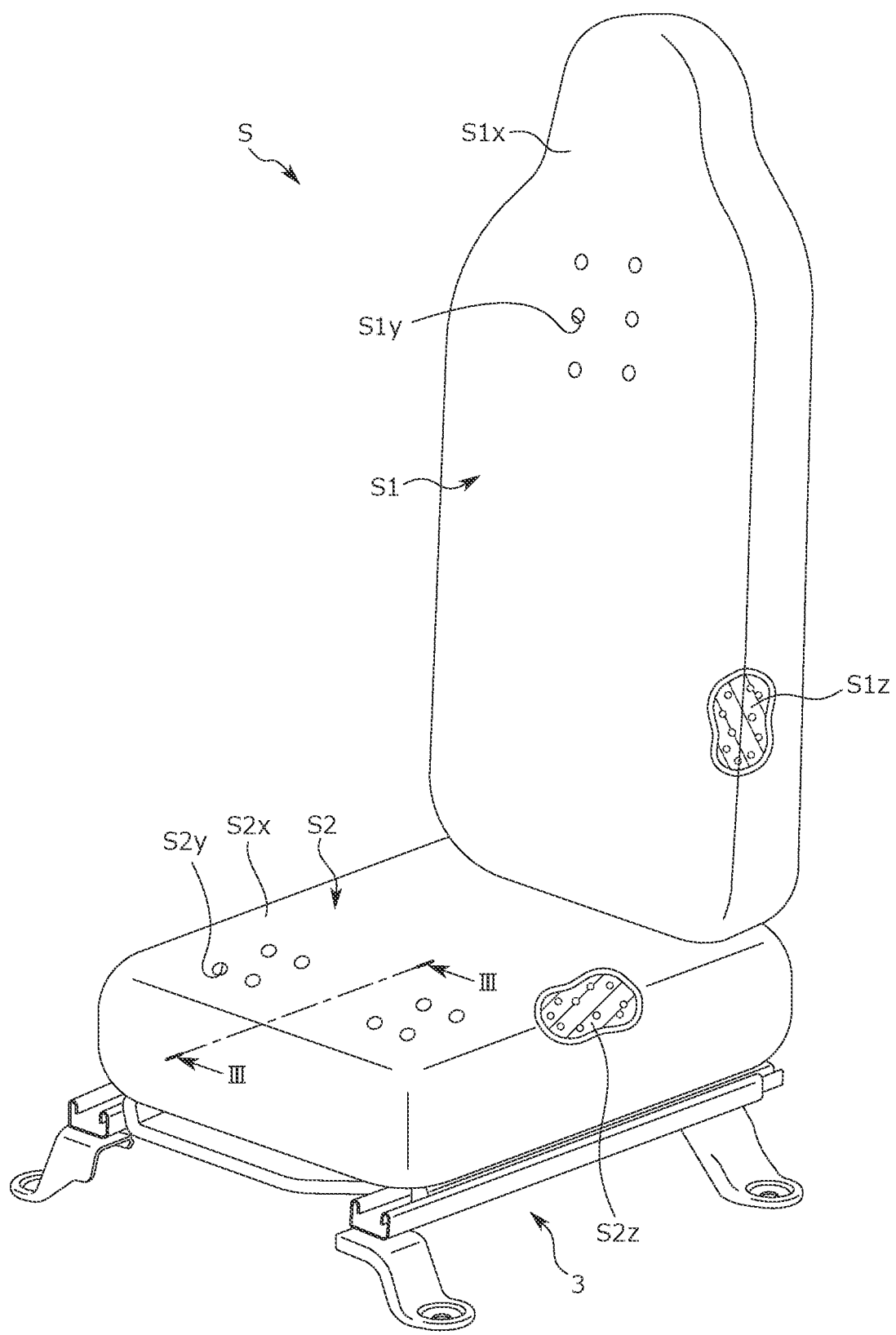
FIG. 1 is a perspective view of a vehicle seat according to this embodiment.

First, the overall configuration of the vehicle seat S according to this embodiment, which is a conveyance seat according to the present invention, will be generally described with reference to mainly FIG. 1. FIG. 1 is a perspective view of the vehicle seat S according to this embodiment.

The vehicle seat S mainly includes a seat back S1 and a seat cushion S2 connected to the seat back S1. In addition, the vehicle seat S is configured such that cushion materials S1z and S2z are placed on the frame F constituting a framework portion and then are covered by covers S1x and S2x.

The seat back S1 includes a seat back frame 1 constituting a framework portion as described later.

The seat cushion S2 forms a seat portion that supports the buttocks of the seat occupant and includes a seat cushion frame 2 constituting the framework portion. The cover S2x of the seat cushion S2 has four right vent holes and four left vent holes S2y. A blower 48 described later is disposed in the interior of the seat cushion S2, and the air generated from the blower 48 is sent to or near the thigh of the seat occupant through the vent holes S2y.

<Frame>

Figure 2A:
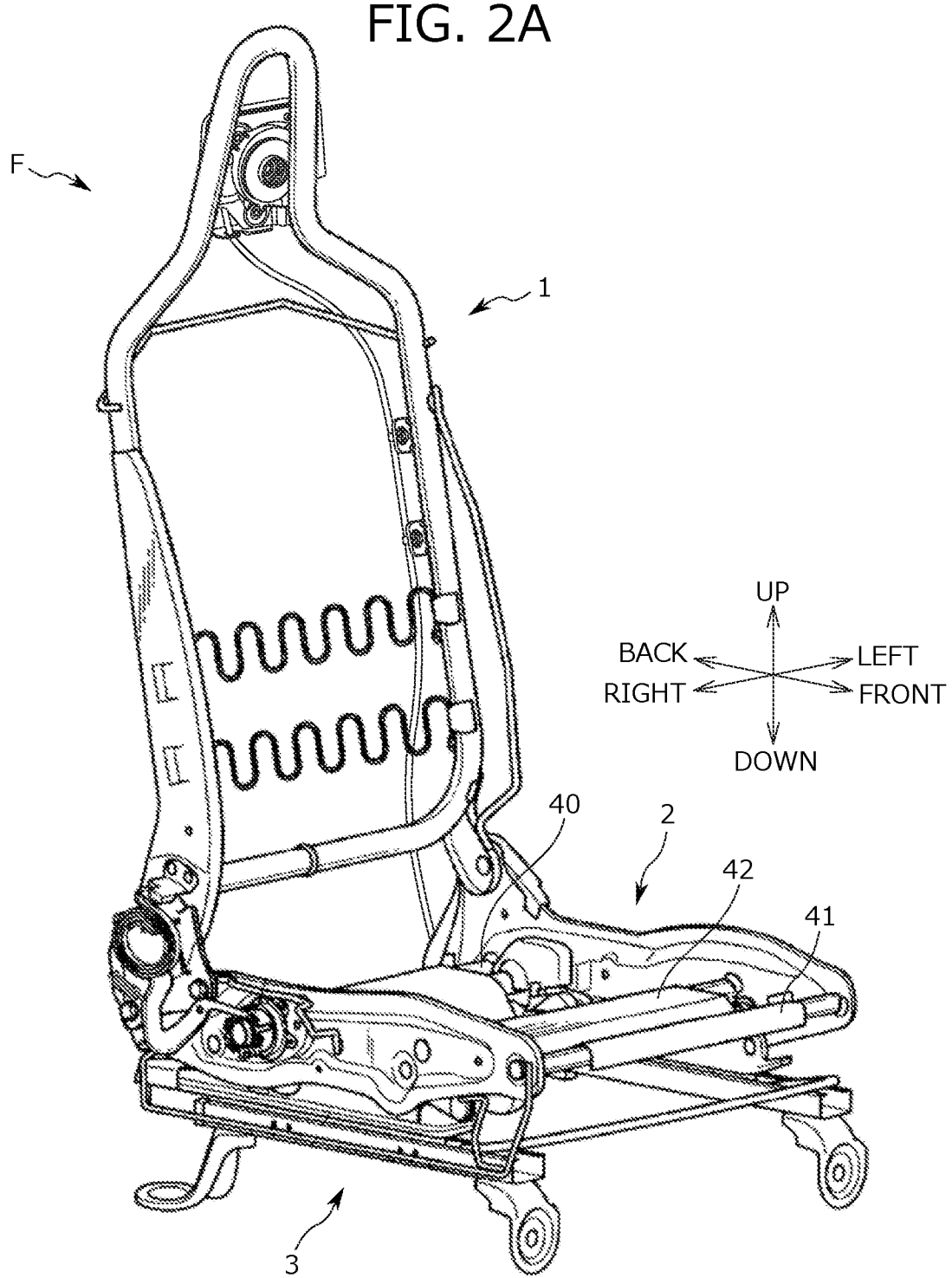
FIG. 2A is a perspective view showing a frame constituting a framework of a vehicle seat.

Next, a frame F constituting a framework of the vehicle seat S will be described with reference to FIGS. 2A and 2B. FIG. 2A is a perspective view of the frame F, and FIG. 2B is a perspective view showing a portion of the frame F, the portion constituting the seat cushion S2.

The frame F mainly includes the seat back frame 1 and the seat cushion frame 2 as shown in FIG. 2A.

As shown in FIG. 2A, the seat cushion frame 2 is attached on slide rails 3 fixed to a vehicle body floor, and can be moved back and forth by the slide rails 3.

Figure 2B:
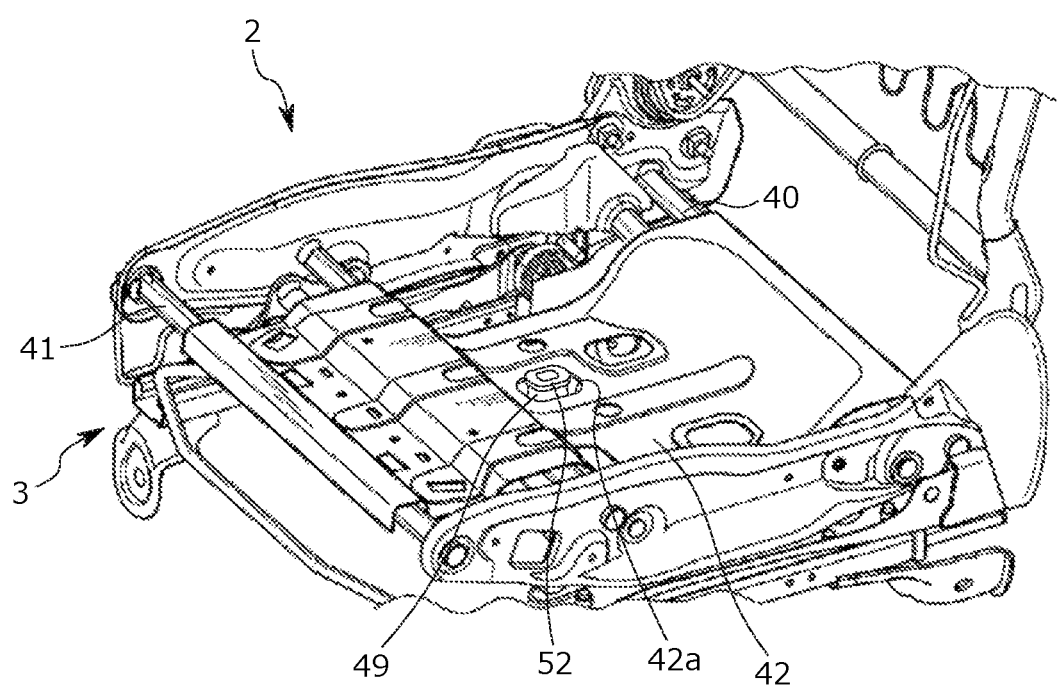
FIG. 2B is a perspective view showing a frame constituting a framework of a seat cushion.

Additionally, as shown in FIG. 2B, the seat cushion frame 2 includes a back side connecting portion 40 disposed backward of the center, a front side connecting portion 41 disposed forward of the center, and a pan frame 42 disposed on the center side in the seat width direction.

The back side connecting portion 40 is linearly formed and extends in the right to left direction at the back end portion of the seat cushion frame 2.

The front side connecting portion 41 is linearly formed and extends in the right to left direction at the front end portion of the seat cushion frame 2.

The pan frame 42 is formed into a plate shape, and is joined to the back side connecting portion 40 and the front side connecting portion 41 by welding with the pan frame 42 extending therebetween in a substantially horizontal direction. The pan frame 42 has an opening 42a through which an end portion of a duct 49, as described later, on the outlet side extends.

<Blower and Members Around Blower>

Figure 3:
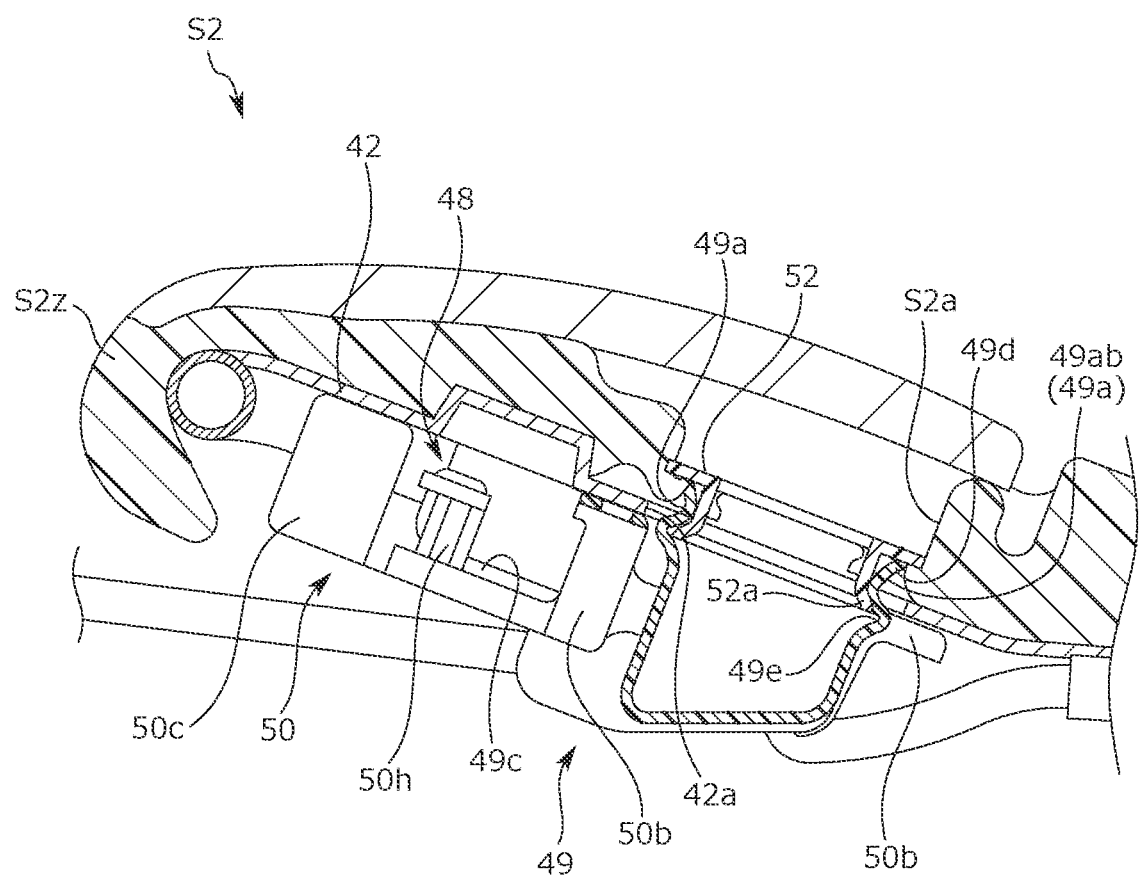
FIG. 3 is a sectional view showing the arrangement of a blower, a bracket, and a duct in the seat cushion, showing a cross section taken along the line III-III of FIG. 1.
Figure 4:
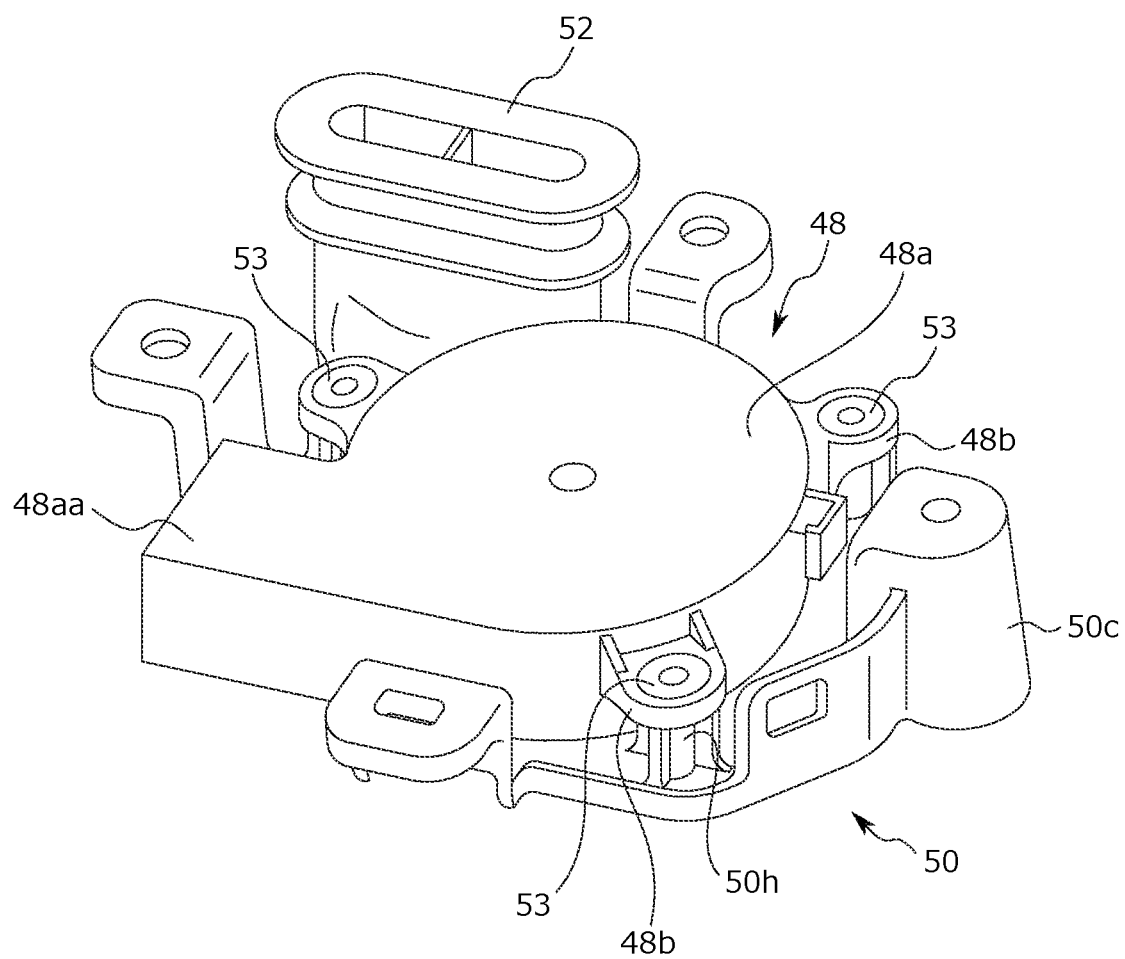
FIG. 4 is a perspective view showing a state in which the blower and the duct are attached to the bracket.
Figure 5:
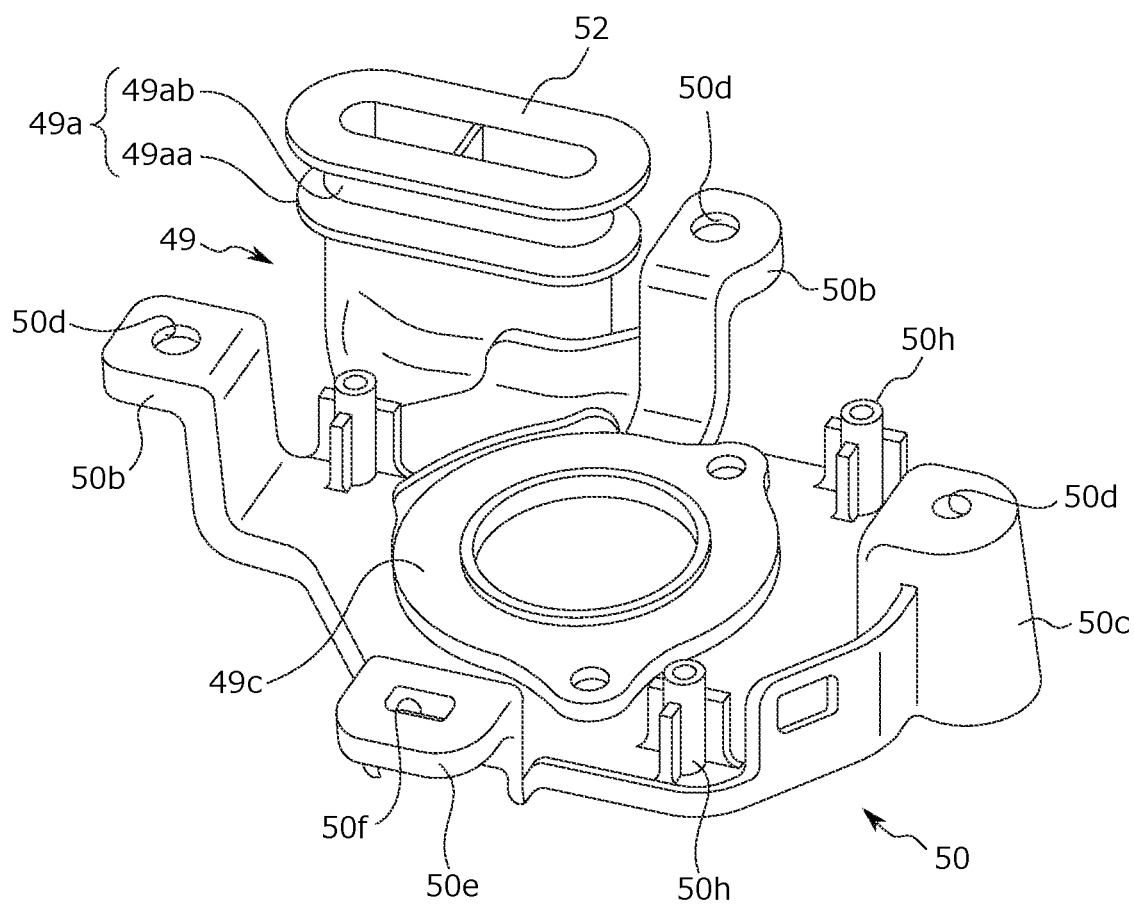
FIG. 5 is a perspective view showing a state in which the duct is attached to the bracket.
Figure 6:
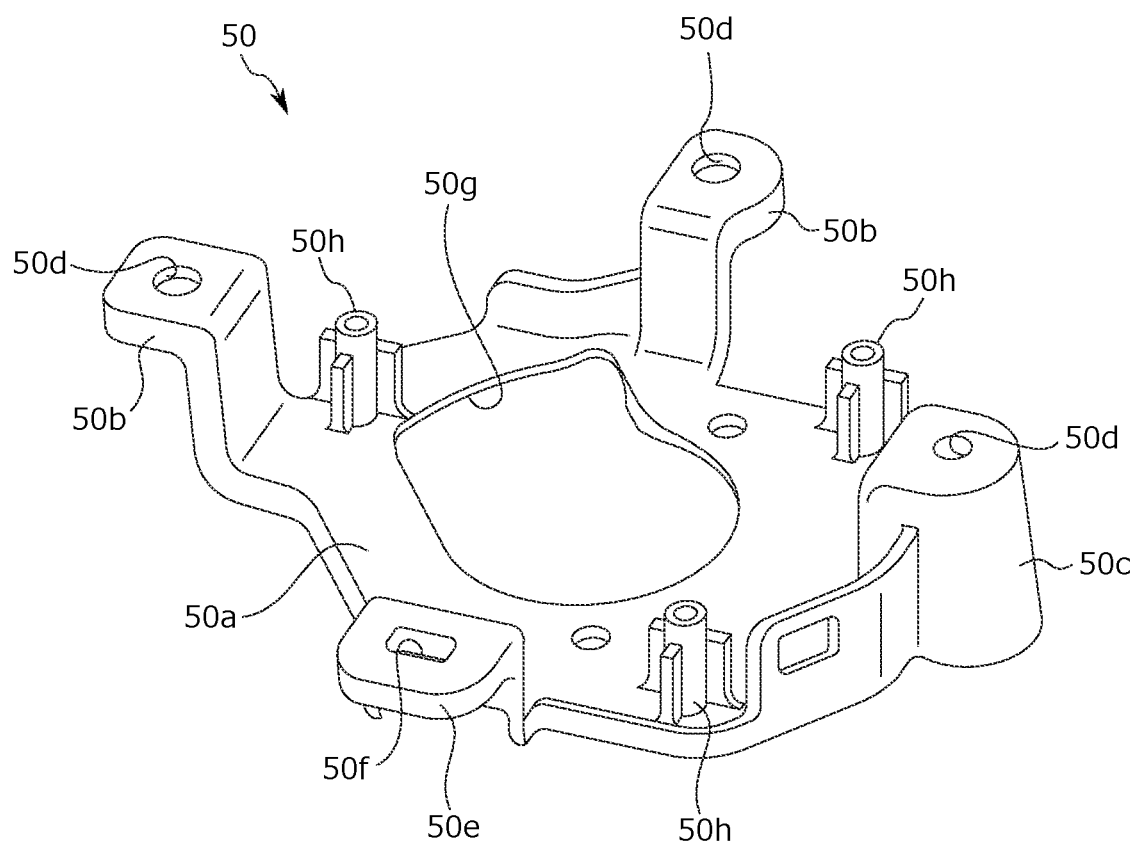
FIG. 6 is a perspective view showing the bracket.
Figure 7:
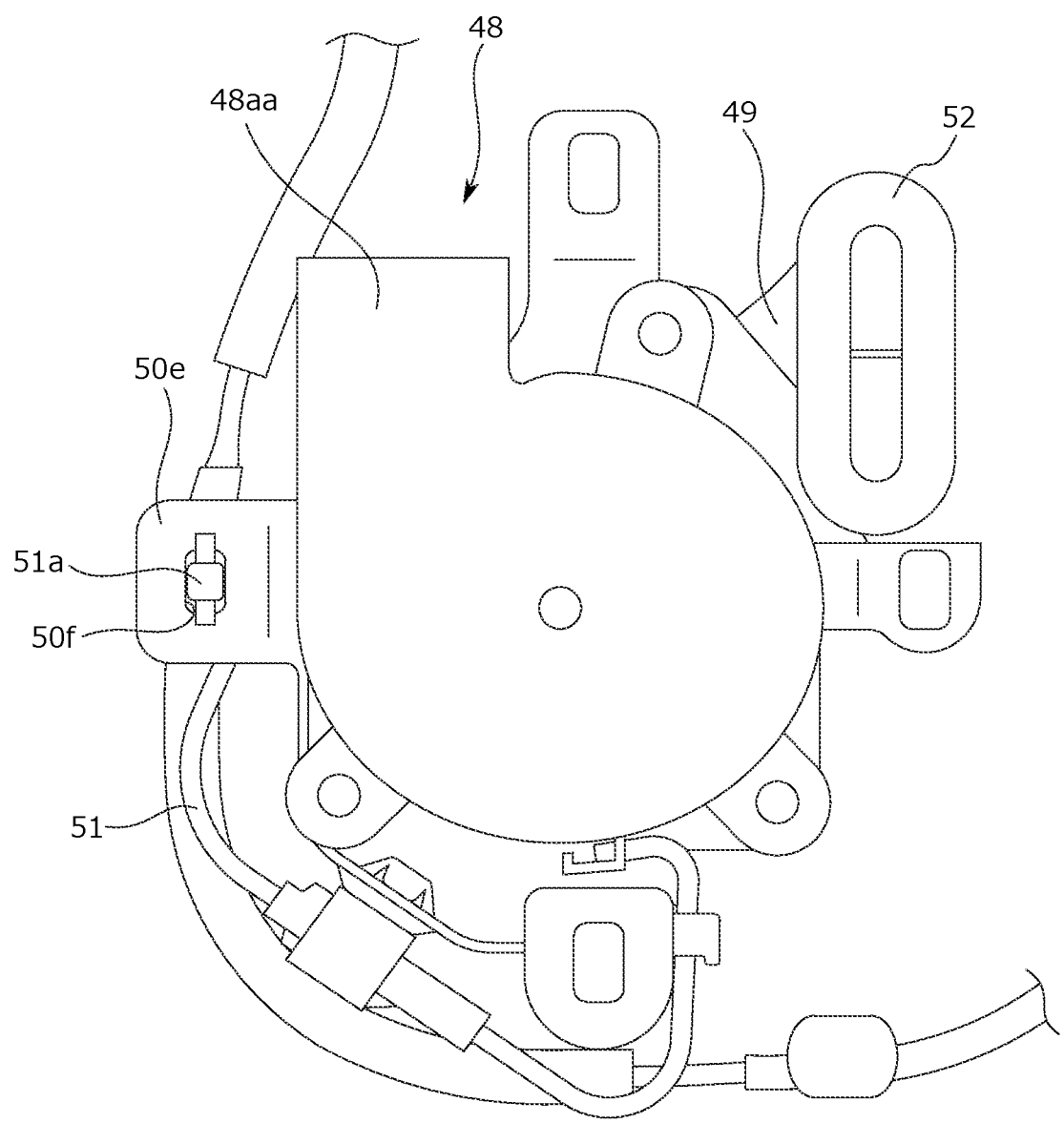
FIG. 7 is a top view showing a state in which a harness is attached to the blower and the bracket.

Next, the blower 48 and the members around the blower 48 will be described with reference to FIGS. 3 to 7 in addition to FIGS. 1, 2A and 2B. FIG. 3 is a sectional view showing the arrangement of the blower 48, a bracket 50 and the duct 49 in the seat cushion S2, showing a cross section taken along the line III-III of FIG. 1. FIG. 4 is a perspective view showing a state in which the blower 48 and the duct 49 are attached to bracket 50. FIG. 5 is a perspective view showing a state in which the duct 49 is attached to the bracket 50. FIG. 6 is a perspective view showing the bracket 50, and FIG. 7 is a top view showing a state in which harness 51 is attached to the blower 48 and the bracket 50.

(Blower)

In the interior of the seat cushion S2, the blower 48 is provided as a fan for generating air toward the buttocks of the seat occupant. The blower 48 corresponds to a fan according to the present invention, and is provided below the pan frame 42.

As shown in FIG. 4, the blower 48 mainly includes a blower main body 48a provided at the center, an inlet portion 48aa protruding backward from the center, and an outlet portion (not shown) provided on the lower side at the center.

Three protruding pieces 48b protruding radially outward from the blower main body 48a are formed on the circumferential surface of the blower main body 48a at a predetermined distance. The blower 48 is disposed on the bracket 50 such that the protruding pieces 48b are placed on attachment protrusions 50h of the bracket 50 as described later. Self-tapping screws 53 extend through through holes (not shown) extending in the up to down direction of the protruding pieces 48b, and the self-tapping screws 53 are screwed into the attachment protrusions 50h, whereby the blower 48 and the bracket 50 are fixed to each other.

Furthermore, the duct 49 as described later is connected to an outlet (not shown) located on the lower side of the blower 48, and is formed such that the air generated from the blower 48 flows to the thigh of the seat occupant through the duct 49, the cushion material S2z, and the vent holes S2y.
(Bracket)

In the seat cushion S2, the bracket 50 for disposing the blower 48 is attached to the pan frame 42.

As shown in FIG. 6, the bracket 50 mainly includes a flat, plate-shaped main body portion 50a formed at a position separated downward from the pan frame 42, attachment legs 50b and 50c serving as attachment portions attached to the pan frame 42, and a fixing leg 50e for fixing the harness 51.

In the center portion of the main body portion 50a, an opening 50g extending therethrough in the thickness direction, through which the duct 49 described later extends, is formed. Thus, since the duct 49 is disposed to extend through the opening 50g of the bracket 50, the arrangement of the duct 49 is not restricted by the bracket 50.

Furthermore, three attachment protrusions 50h protruding upward are formed on the side of the upper surface of the main body portion 50a. The attachment protrusions 50h are those for supporting the blower 48 with a part of the protrusions extending through attachment holes (not shown) formed in the blower 48, and for receiving the self-tapping screws 53 to screw the blower 48 and the bracket 50 together. The attachment protrusions 50h have a cylindrical shape with ribs formed on the circumferential surface thereof.

In this way, the blower 48 is not directly fixed to the pan frame 42 and is attached to the attachment protrusions 50h provided on the main body portion 50a of the bracket 50 by the self-tapping screws 53. That is, since the blower 48 is attached to the pan frame 42 via the bracket 50, it is possible to prevent the vibration generated by the drive of the blower 48 from being transmitted to the seat occupant.

The attachment legs 50b and 50c are portions of the bracket 50 that are attached to the pan frame 42, and extend upward continuously from the outer edge of the main body portion 50a.

The fixing leg 50e has a fixing hole 50f extending therethrough in the up to down direction as shown in FIG. 7. The fixing hole 50f functions as a fixing portion that fixes the harness 51 connected to the blower 48. Specifically, a clip 51a is attached to the harness 51, and the clip 51a is inserted into the fixing hole 50f, whereby the harness 51 is fixedly supported by the fixing leg 50e. Thus, the fixing hole 50f for fixing the clip 51a of the harness 51 is provided in the bracket 50, whereby the harness 51 is easily and stably fixed to the bracket 50.
(Duct)

The duct 49 has a function of guiding the air generated by the blower 48 upward of the pan frame 42 and is a cylindrical member formed in a substantially J shape.

The duct 49 includes a flange 49c provided at an end portion on the side of an air inlet and a bellows portion 49a provided at an end portion on the side of an air outlet.

The flange 49c is a portion interposed between a outlet port on the lower side of the blower 48 and the upper surface of the main body portion 50a of the bracket 50. As can be seen from FIGS. 5 and 6, the flange 49c is fixed to the bracket 50 by a self-tapping screw (not shown) with the flange being in contact with a periphery defining the opening 50g of the bracket 50.

The bellows portion 49a has a bellows shape that includes a protrusion 49aa formed to have substantially the same thickness and protruding outward, and a recess 49ab formed continuously from the protrusion 49aa in a direction perpendicular to the pan frame 42 and recessed inward.

A portion of the bellows portion 49a on the inner surface side where the protrusion 49aa is formed on the outer surface side, that is, a portion of the bellows portion 49a recessed on the inner surface side, is engaged with an annular lower end portion of the connecting member 52 that has a shape widening toward the end.

Furthermore, the duct 49 is disposed so that the recess 49ab overlaps with the opening 42a of the pan frame 42 in the thickness direction of the pan frame 42. Since the duct 49 is disposed in this manner, the periphery defining the opening 42a enters the recess 49ab of the duct 49, and the duct 49 can be prevented from coming off the pan frame 42.

The connecting member 52 is a member that connects the cushion material S2z and the duct 49, and has a function of communicating holes connected to the vent holes S2y and formed in the cushion material S2z and an end portion on the outlet side of the duct 49. As described above, the opening 42a is formed in the pan frame 42, and the connecting member 52 attached to the end portion on the outlet side of the duct 49 is arranged so as to protrude upward through the opening 42a.

In this way, since the opening 42a is formed in the pan frame 42, the air generated from the blower 48 can be sent upward of the pan frame 42 through the duct 49, and the duct 49 can be compactly arranged without being inhibited by the pan frame 42. Furthermore, the blower 48 can be compactly attached in the seat cushion S2 provided with the pan frame 42.

The pan frame 42 according to the embodiment is described as being disposed to extend between the front and back sides of the seat cushion frame 2 without covering the entire seat cushion frame 2, and, as shown in FIG. 2B, there is a space extending through in the up to down direction in a portion on the right and left sides of the pan frame 42. However, the present invention is not limited to such a configuration, and the pan frame may be disposed to extend between the right and left sides of the seat cushion frame, and be formed across the entire horizontal area of the seat cushion frame.

<Seat Cushion Frame According to Modifications>

Figure 8:
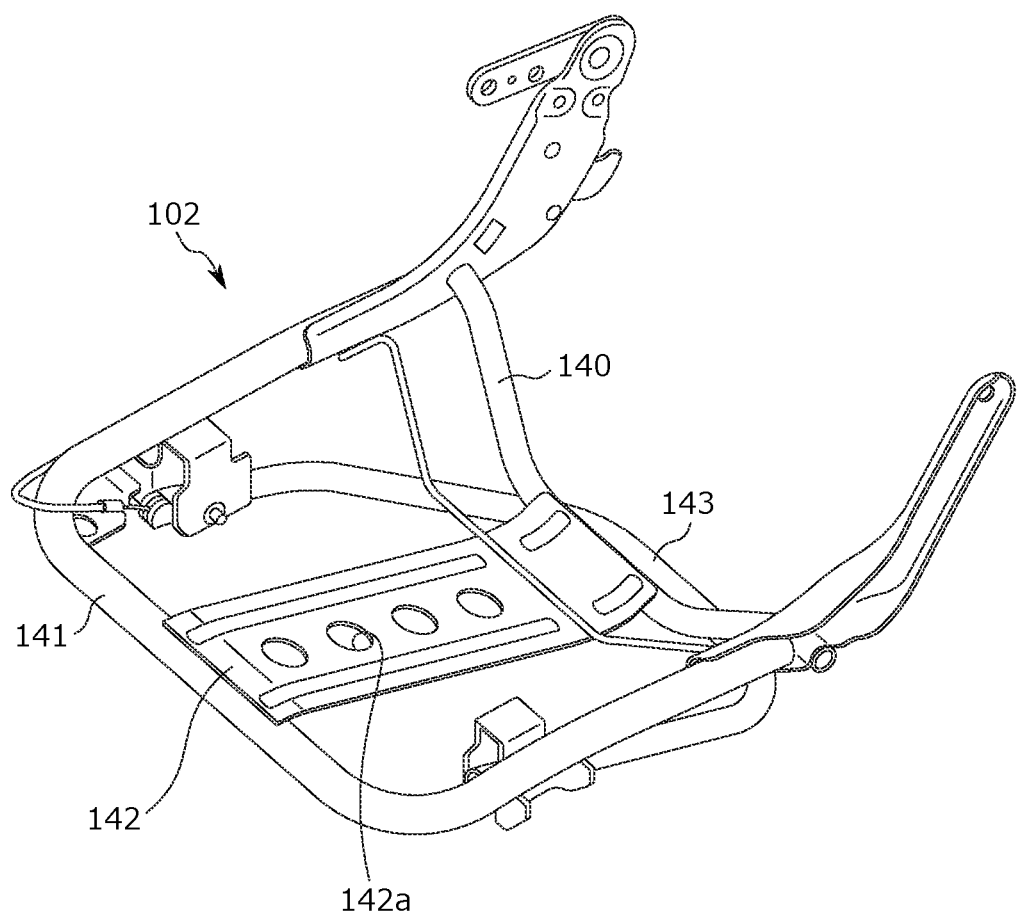
FIG. 8 is a perspective view showing a seat cushion frame of the vehicle seat according to a first modification.
Figure 9:
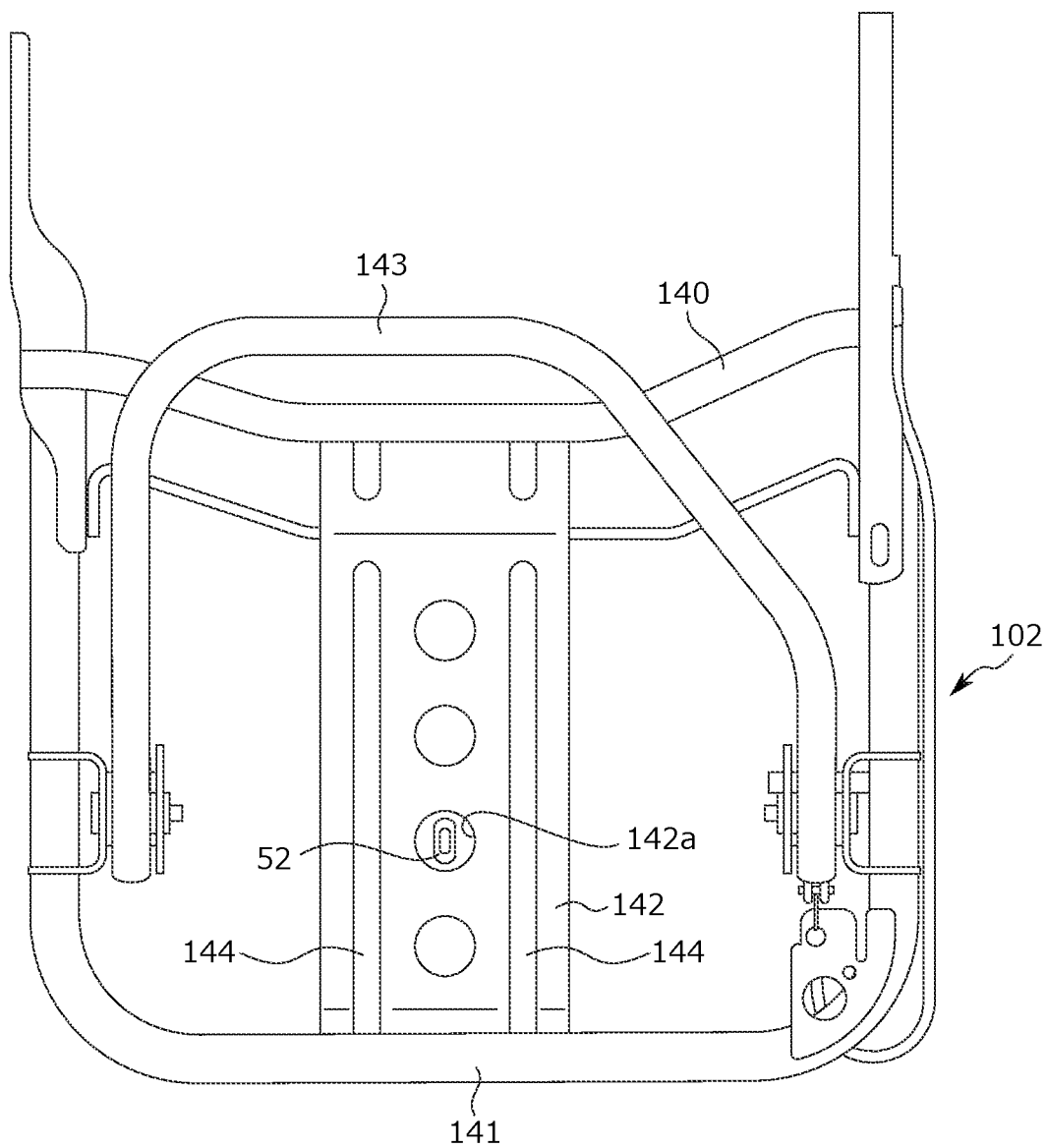
FIG. 9 is a bottom view showing the seat cushion frame of the vehicle seat according to the first modification.

In the above embodiment, the seat cushion frame 2 fixed to the vehicle body floor via the slide rail 3 is described as an example. However, the present invention is not limited to this, and a seat cushion frame fixed to the vehicle body floor by a mechanism different from the slide rail 3 may be also possible. Specifically, a seat cushion frame 102 shown in FIGS. 8 and 9 may be applied. FIG. 8 is a perspective view showing the seat cushion frame 102 according to the modification, and FIG. 9 is a view showing the seat cushion frame 102 according to the modification as viewed from below.
(First Modification)

Hereinafter, the configuration of the seat cushion frame 102 of the vehicle seat S according to a first modification will be described with reference to FIGS. 8 and 9.

As shown in FIGS. 8 and 9, the seat cushion frame 102 according to the first modification includes a back side connecting portion 140 disposed backward of the center, a front side connecting portion 141 disposed forward of the center, a pan frame 142 extending between the back side connecting portion 140 and the front side connecting portion 141. As shown in FIG. 8, the back end portion of the pan frame 142 attached to the back side connecting portion 140 is located below the level of the front end portion of the pan frame 142 attached to the front side connecting portion 141.

Furthermore, as shown in FIGS. 8 and 9, a foot portion 143 formed by bending a pipe material into a substantially U shape is provided between opposite side portions of the seat cushion frame 102. The foot portion 143 is rotatably supported by the opposite side portions of the seat cushion frame 102. The foot portion 143 rotates between a close position close to the vehicle body floor and a separated position separated from the vehicle body floor.

When the foot portion 143 is in the close position, the lower end of the foot portion 143 is locked to a locking mechanism (not shown) attached to the vehicle body floor, so that the seat cushion frame 102 is fixed to the vehicle body. When the lock by the lock mechanism is released, the foot portion 143 rotates from the close position to the separated position, so that the seat cushion frame 102 can be movable relative to the vehicle body floor.

The pan frame 142 has an opening 142a through which the end of the duct 49 on the outlet side extends. First reinforcing portions 144 extending in the front to back direction are formed on the right and left sides of the opening 142a. The first reinforcing portions 144 are, for example, beads formed on the pan frame 142.

Thus, since the first reinforcing portions 144 are provided on opposite sides of the opening 142a, it is possible to prevent a decrease in rigidity of an area around the opening 142a.

Furthermore, since the first reinforcing portions 144 are provided, it is possible to enlarge the opening 142a, thereby ensuring a sufficient amount of air from the blower 48.

Although not specifically shown in FIGS. 8 and 9, the blower 48 is also installed below the pan frame 142 in the seat cushion frame 102 according to the first modification. The duct 49 extending from the blower 48, and the connecting member 52 connected to the duct 49 extend upward of the pan frame 142 through the opening 142a. Thus, the air generated from the blower 48 and sent through the duct 49 is exhausted from the vent holes S2y of the seat cushion S2 through the opening 142a of the pan frame 142.

The above example in which the air is sent from the vent holes S2y of the seat cushion S2 is described. However, the air may be sucked from the vent holes S2y of the seat cushion S2 toward the blower 48.

(Second Modification)

Next, the configuration of the seat cushion frame 102 of the vehicle seat S according to a second modification will be described with reference to FIG. 10.

Figure 10:
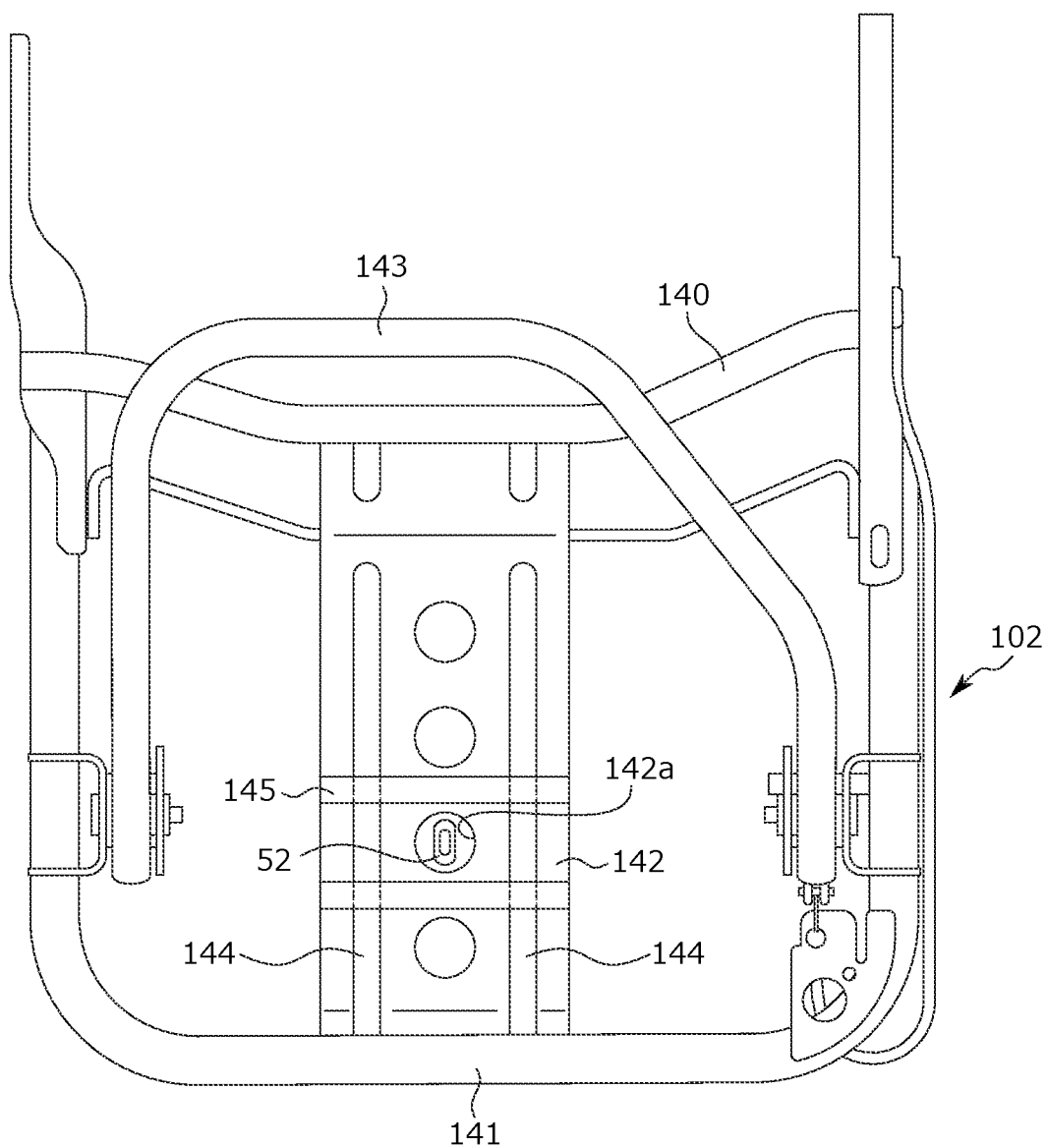
FIG. 10 is a bottom view showing a seat cushion frame of the vehicle seat according to a second modification.

In FIG. 10, the seat cushion frame 102 according to the second modification is different from the seat cushion frame 102 according to the first modification in that the pan frame 142 is further provided with second reinforcing portions 145. Hereinafter, differences from the first modification will be described.

As shown in FIG. 10, in the pan frame 142 according to the second modification, the first reinforcing portions 144 extending in the front to back direction and the second reinforcing portions 145 extending in the right to left direction are formed around the opening 142a through which the duct 49 extending from the blower 48 and the connecting member 52 extend.

The second reinforcing portions 145 may be beads formed on the pan frame 142 or may be wire members or plate members attached to the pan frame 142.

In the case where the second reinforcing portions 145 are formed from metal wire members, when the pan frame 142 is made of metal, the second reinforcing portion 145 may be formed, for example, by welding metal wire members or plate members to the pan frame 142. In addition, when the pan frame 142 is made of resin, the second reinforcing portion 145 may be formed, for example, by embedding metal wire members or plate members in the pan frame 142.

In this way, since the opening 142a, through which the connecting member 52 extends, is surrounded by the first reinforcing portions 144 and the second reinforcing portions 145, it is possible to further prevent a decrease in rigidity of an area around the opening 142a.

Moreover, since the first reinforcing portion 144 and the second reinforcing portion 145 are provided, it is possible to enlarge the opening 142a, thereby ensuring a sufficient amount of air from the blower 48.

The duct 49 extending from the blower 48 is provided so as to extend along the second reinforcing portion 145 in the right to left direction above the pan frame 142. This enables the interference between the duct 49 and the second reinforcing portions 145 to be prevented and thus facilitates the attachment of the duct 49.

(Third Modification)

Next, the configuration of the seat cushion frame 102 of the vehicle seat S according to a third modification will be described with reference to FIG. 11.

The seat cushion frame 102 according to the third modification is different from the seat cushion frame 102 according to the first modification in the configuration of the pan frame 142. Hereinafter, the differences will be described.

Figure 11:
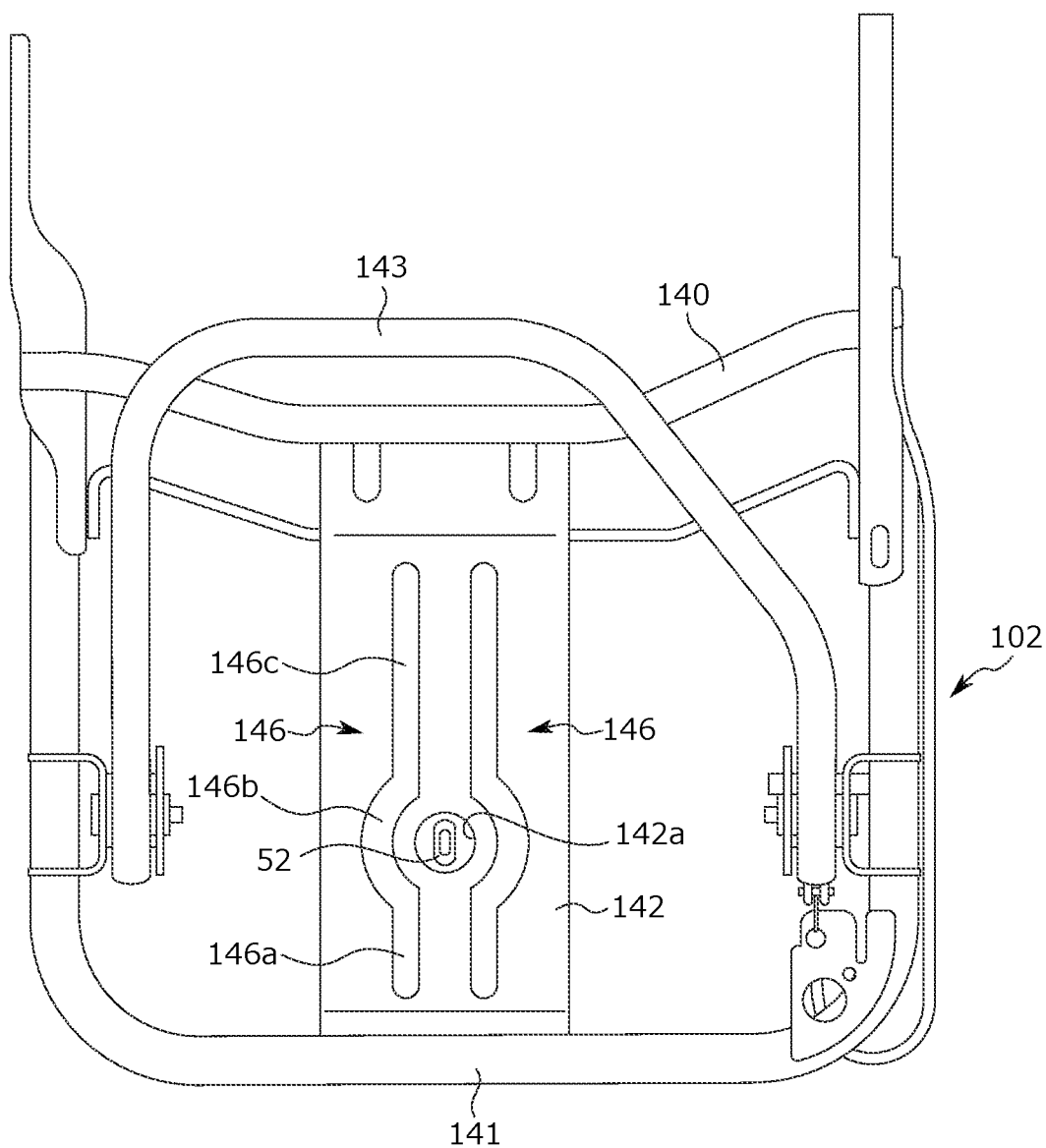
FIG. 11 is a bottom view showing a seat cushion frame of the vehicle seat according to a third modification.

As shown in FIG. 11, the only one opening 142a is formed in the pan frame 142 according to the third modification. The duct 49 extending from the blower 48, and the connecting member 52 connected to the duct 49 extend through the opening 142a.

Third reinforcing portions 146 are formed on the right and left sides of the opening 142a. The third reinforcing portions 146 each include a first straight portion 146a, a curved portion 146b, and a second straight portion 146c.

The third reinforcing portions 146 may be formed as beads, or may be formed from wire members or plate members.

The first straight portion 146a is a straight reinforcing portion formed forward of the opening 142a. The first straight portion 146a extends in the front to back direction and is formed so as to at least partially overlap the opening 142a in the seat width direction.

The curved portion 146b is a reinforcing portion connected to the back end of the first straight portion 146a and curved along the opening 142a.

The second straight portion 146c is a linear reinforcing portion connected to the back end of the curved portion 146b and formed backward of the opening 142a. The second straight portion 146c extends in the front-back direction and is formed so as to at least partially overlap the opening 142a in the seat width direction.

In the seat cushion frame 102 according to the third modification, the third reinforcing portions 146 can be formed close to the opening 142a. This enables the prevention of a decrease in rigidity of an area around the opening 142a.

Moreover, since the third reinforcing portions 146 are provided, it is possible to enlarge the opening 142a, thereby ensuring a sufficient amount of air from the blower 48.

(Fourth Modification)

Next, the configuration of the seat back frame 1 of the vehicle seat S according to a fourth modification will be described with reference to FIG. 12.

Figure 12:
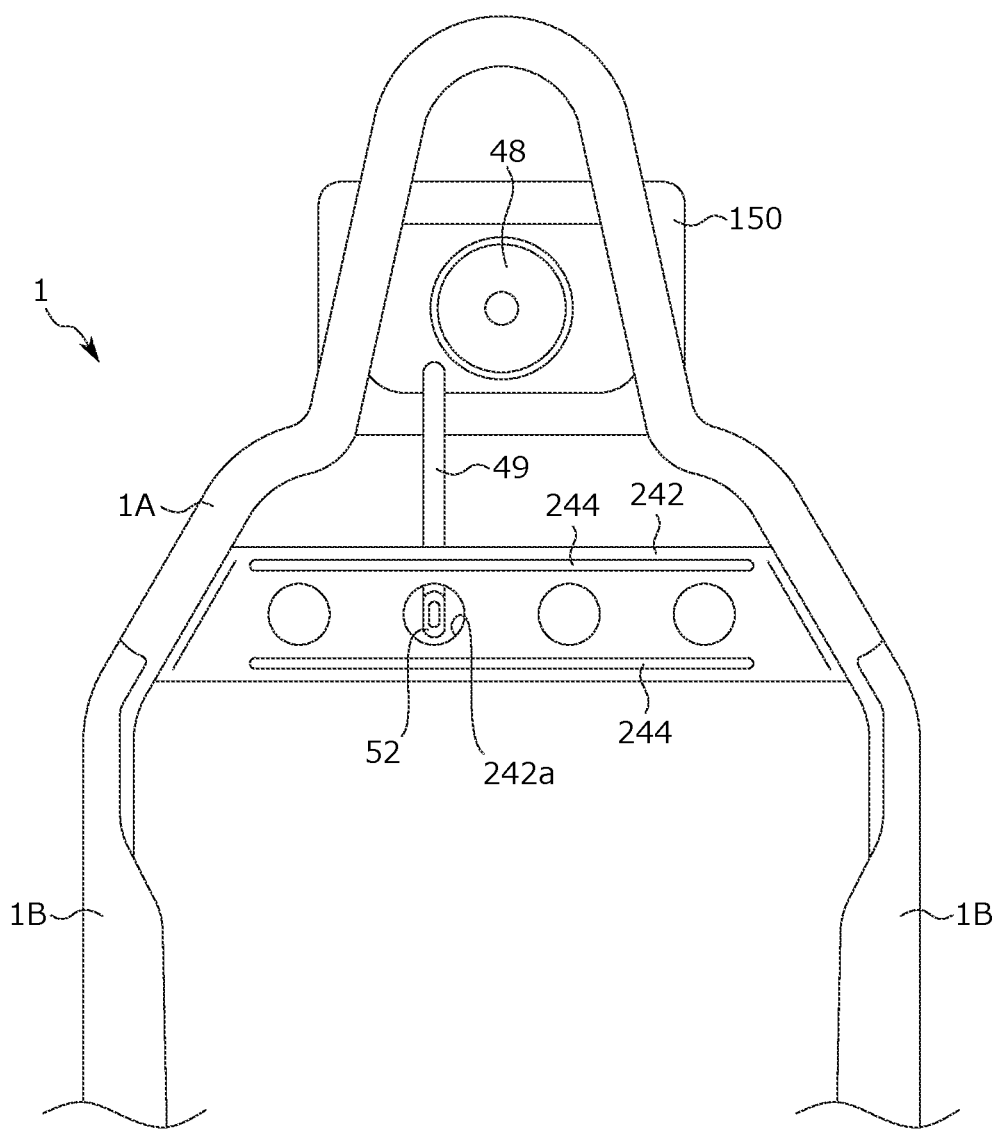
FIG. 12 is a front view showing a seat back frame of the vehicle seat according to a fourth modification.

As shown in FIG. 12, in the seat back frame 1 according to the fourth modification, a pan frame 242 is attached to the seat back frame 1, and the duct 49 extending from the blower 48, and the connecting member 52 connected to the duct 49 extend forward of the pan frame 242 through an opening 242a formed in the pan frame 242.

Specifically, the seat back frame 1 includes an upper frame 1A and side frames 1B attached to right and left ends of the upper frame 1A.

The pan frame 242 is attached to the upper frame 1A so as to extend between right and left sides of the upper frame 1A. For example, the pan frame 242 may be attached to the upper frame 1A by welding, or may be attached by mechanical joint such as a bolt.

In the pan frame 242, a plurality of opening 242a is formed. The openings 242a are formed to be aligned in the right to left direction at the center of the pan frame 242 in the up to down direction.

Fourth reinforcing portions 244 extending in the right to left direction are formed above and below the openings 242a. For example, the fourth reinforcing portions 244 may be formed as beads, or may be formed from wire members or plate members.

Through the opening 242a, the duct 49 extending from the blower 48, and the connecting member 52 connected to the duct 49 extend forward of the pan frame 242. This connecting member 52 is connected to the cushion material S1z of the seat back S1.

Thus, the air generated from the blower 48 and sent through the duct 49 is exhausted from the vent holes S1y of the seat back S1 through the opening 242a of the pan frame 242.

The above example in which the air is sent from the vent holes S1y of the seat back S1 is described. However, the air may be sucked from the vent holes S1y of the seat back S1 toward the blower 48.

In this way, since the pan frame 242 is attached to the seat back frame 1 in accordance with the position of the vent holes S1y formed in the seat back S1, the duct 49 extending from the blower 48 can be easily arranged.

Further, since the fourth reinforcing portions 244 are formed around the opening 242a through which the connecting member 52 extends, it is possible to prevent a decrease in rigidity of an area around the opening 242a.

Since the fourth reinforcing portions 244 are provided in this way, it is possible to enlarge the opening 242a, thereby ensuring a sufficient amount of air from the blower 48.

REFERENCE SIGNS LIST

S: vehicle seat (conveyance seat)
S1: seat back
S1x: cover
S1y: vent hole
S1z: cushion material
S2: seat cushion
S2a: hole of cushion material
S2x: cover
S2y: vent hole
S2z: cushion material
F: seat frame
1: seat back frame
1A: upper frame
1B: side frame
2: seat cushion frame
3: slide rail
40: back side connecting portion
41: front side connecting portion
42: pan frame
42a: opening
48: blower (fan)
48a: blower body
48aa: inlet portion
48b: protruding piece
49: duct
49a: bellows portion
49aa: protrusion
49ab: recess
49c: flange
49d: end portion on outlet side of duct
49e: inner side recessed portion
50: bracket
50a: main body portion
50b, 50c: attachment leg (attachment portion)
50d: fixing hole
50e: fixing leg
50f: fixing hole (fixing portion)
50g: opening
50h: attachment protrusion
51: harness
51a: clip
52: connecting member
52a: lower end portion
53: self-tapping screw
102: seat cushion frame
140: back side connecting portion
141: front side connecting portion
142: pan frame
142a: opening
143: foot portion
144: first reinforcing portion
145: second reinforcing portion
146: third reinforcing portion
146a: first straight portion
146b: curved portion
146c: second straight portion
150: bracket
242: pan frame
242a: opening
244: fourth reinforcing portion

The invention claimed is:
1. A conveyance seat, comprising:
a seat cushion, and
a fan provided in the seat cushion, wherein
the seat cushion comprises a front side connecting portion disposed at a front end portion of the seat cushion and extending in a right to left direction of the conveyance seat and a plate-shaped pan frame coupled to the front side connecting portion,
the fan is provided below the pan frame,
a duct is connected to the fan,
an opening through which the duct extends in a thickness direction of the pan frame is formed in the pan frame,
the duct comprises a bellows portion having a bellows shape including a recess and a protrusion that are formed continuously in the thickness direction of the pan frame,
the recess of the bellows portion is disposed at a position that overlaps the opening of the pan frame in the thickness direction of the pan frame, and
a periphery defining the opening of the pan frame enters the recess of the bellows portion.
2. The conveyance seat according to claim 1, further comprising
a bracket for disposing the fan in the seat cushion; wherein the bracket includes a main body portion formed at a position separated from the pan frame with the bracket being attached to the pan frame, and attachment portions attached to the pan frame, and the fan is attached to the main body portion of the bracket.

3. The conveyance seat according to claim 2, wherein an opening through which the duct extends is formed in the bracket.

4. The conveyance seat according to claim 2, wherein a harness is connected to the fan, a clip is attached to the harness, and a fixing portion for fixing the clip is provided in the bracket.

5. A conveyance seat, comprising:

a seat cushion, and a fan provided in the seat cushion, wherein the seat cushion comprises a plate-shaped pan frame and a cushion material, the fan is provided below the pan frame, a duct is connected to the fan, an opening through which the duct extends in a thickness direction of the pan frame is formed in the pan frame, the duct comprises a bellows portion having a bellows shape including a recess and a protrusion that are formed continuously in the thickness direction of the pan frame, a connecting member is attached to an end portion on an outlet side of the duct, wherein the connecting member communicates the end portion on the outlet side of the duct and a hole formed in the cushion material, the bellows portion includes an inner side recessed portion formed on an inner surface side of a portion of the bellows portion where the protrusion of the bellows portion is formed, and a lower end portion of the connecting member is engaged with the inner side recessed portion of the bellows portion.

6. The conveyance seat according to claim 5, further comprising:

a bracket for disposing the fan in the seat cushion; wherein the bracket includes a main body portion formed at a position separated from the pan frame with the bracket being attached to the pan frame, and attachment portions attached to the pan frame, and the fan is attached to the main body portion of the bracket.

7. The conveyance seat according to claim 6, wherein an opening through which the duct extends is formed in the bracket.

8. The conveyance seat according to claim 6, wherein a harness is connected to the fan, a clip is attached to the harness, and a fixing portion for fixing the clip is provided in the bracket.

* * * * *